United States Patent [19]

Häkkinen

[11] 4,147,843
[45] Apr. 3, 1979

[54] ACID MIXTURE FOR THE ELECTROLYTE OF A GALVANIC BATTERY, AND A METHOD FOR PRODUCING SAID MIXTURE

[75] Inventor: Allan K. Häkkinen, Vantaa, Finland

[73] Assignee: Oy Airam AB, Helsinki, Finland

[21] Appl. No.: 843,697

[22] Filed: Oct. 19, 1977

[51] Int. Cl.$^2$ .............................................. H01M 4/36
[52] U.S. Cl. .................................. 429/109; 429/189; 252/317
[58] Field of Search ....................... 429/109, 189, 202; 252/189, 259.5, 317

[56] References Cited

U.S. PATENT DOCUMENTS

| | | | |
|---|---|---|---|
| 377,210 | 1/1888 | Pennock | 429/202 |
| 3,247,024 | 4/1966 | Tamminen | 429/109 |
| 3,861,957 | 1/1975 | Koivisto | 429/109 |

Primary Examiner—Donald L. Walton
Attorney, Agent, or Firm—Bucknam and Archer

[57] ABSTRACT

There is provided an acid mixture to use as the electrolyte of a galvanic battery of the type in which the electrolyte flows through the battery cells as a liquid solution, said mixture being composed of sulfuric acid and powdered chromic acid. The acids are mixed together to form a paste-like mass which is, when the battery is being used, introduced into the water stream flowing into the battery. Flaky chromic acid may be pulverized by grinding in a ball mill before mixing with the sulphuric acid, or the acid components may be mixed before such grinding.

9 Claims, No Drawings

ACID MIXTURE FOR THE ELECTROLYTE OF A GALVANIC BATTERY, AND A METHOD FOR PRODUCING SAID MIXTURE

BACKGROUND OF THE INVENTION

1. Field of the Invention

The present invention relates to an acid mixture to be used as the electrolyte precursor of a galvanic battery in which the electrolyte flows as a liquid solution. The invention also relates to a method for producing such an acid mixture.

2. Description of the Prior Art

In many mobile devices, as well as in reserve power plants, etc., batteries are needed which are capable of providing, with high efficiency, energy for a short time and are also lightweight and store well.

In batteries of the type specified in the introduction, the power of the battery has been increased by causing the electrolyte to flow through its cells. The electrolyte which has been used in these batteries is a mixture of diluted sulphuric acid and diluted chromic acid. This mixture has been produced by providing for the chromic acid and for the sulphuric acid each a separate container, from which a precisely determined quantity of each substance has been directed into a water flow, and thus the said diluted acid mixture has been produced. The disadvantage therein involved is the relatively large total volume and the difficulty in maintaining the homogeneity of the acid mixture at all stages of operation. In general, such batteries are used for purposes in which it is important, even necessary, that the volume of the battery and the acids it requires is as small as possible, and that the acid mixture is as exact as possible at all stages of operation. Care must also be taken that the acids are fed with precision into the water flow and into the inside of the battery; if sulphuric acid comes into contact with the electrodes of the battery before being mixed with chromic acid, the battery is passivated and becomes useless.

SUMMARY OF THE INVENTION

According to the present invention there is provided an acid mixture to be used to form the electrolyte of a galvanic battery in which the electrolyte flows as a liquid solution, said mixture comprising a mixture of sulphuric acid and powdered chromic acid. This acid mixture is produced by mixing powdered chromic acid and concentrated sulphuric acid together to form a paste-like mass.

It is an object of the present invention to eliminate the problems explained above and to provide, for the preparation of the electrolyte of such galvanic battery, a suitable acid mixture which requires less space than previously and eliminates the risk of faulty timing of faulty feed ratio of the acids.

DESCRIPTION OF THE PREFERRED EMBODIMENTS

According to the present invention, chromic acid and concentrated sulphuric acid are mixed with each other in advance in a suitable ratio and are kept in one and the same container, whereby the volume required by the acids is reduced by approx. 30%. At the same time an advantage is gained in that, when the mixture is diluted, the ratio of chromic acid to sulphuric acid always remains essentially constant.

When the acid mixture is produced, it is important that the chromic acid is ground very finely in a ball mill, the acids are mixed, during or after the grinding with each other to form a paste-like substance. Thereby an advantage is gained in that, when the acid mixture is diluted in the battery feed pipe with water, the finely ground chromic acid also dissolves rapidly in water whereby a homogeneous electrolyte mixture flows into the battery.

Example

The production of an acid mixture takes place as follows, for example:

Chromic acid is ground, while dry, in a ball mill for approx. 10–20 hours, depending on the mill size, until at least 95% of it passes 200 mesh. With the thus ground chromic acid, a concentrated sulphuric acid is mixed, for example in a weight ratio of 1:1.3. In the example case, 400 g of chromic acid and 550 g of technical sulphuric acid (approx. 93%) were used. The mixing is performed by pouring the sulphuric acid into the chromic acid while agitating the mixture with, for example, a glass rod. A paste-like mixture is thus obtained, which remains homogeneous and, when diluted with water to a concentration suitable for a battery, it dissolves rapidly, thereby forming an electrolyte similar to that obtained if the said acids are mixed separately with water at the above weight ratio.

What is claimed is:

1. An electrolyte precursor composition for use in a galvanic battery in which the electrolyte flows as a liquid solution, said composition comprising a paste-like mixture of concentrated sulphuric acid and powdered chromic acid.

2. A composition according to claim 1 which contains powdered chromic acid and concentrated sulphuric acid in a weight ratio of about 1:1.3.

3. A composition according to claim 1, wherein the particle size of the powdered chromic acid is such that at least 95% of it passes 200 mesh.

4. A method for producing an acid mixture to be used for the formation of the electrolyte of a galvanic battery in which the electrolyte flows as a liquid solution comprising mixing powdered chromic acid and concentrated sulphuric acid together to form a paste-like mass.

5. A method according to claim 4, wherein flaky chromic acid is pulverized and thereupon mixed with sulphuric acid.

6. A method according to claim 5, wherein the chromic acid is pulverized in a ball mill.

7. A method according to claim 4, wherein flaky chromic acid is first mixed with sulphuric acid and thereafter the wet mass is ground to pulverize the chromic acid.

8. A method according to claim 7, wherein the wet mass is ground in a ball mill.

9. A method according to claim 4, wherein the chromic acid and the sulphuric acid are mixed with each other in a weight ratio of 1:1.3.

* * * * *